United States Patent [19]

Hall et al.

[11] Patent Number: 4,793,497
[45] Date of Patent: Dec. 27, 1988

[54] TILT-SHELF DISPLAY CART

[75] Inventors: Don Hall, Chattanooga; Charles F. A. Laitner, Jr., Signal Mountain, both of Tenn.

[73] Assignee: Cumberland Corporation, Chattanooga, Tenn.

[21] Appl. No.: 100,852

[22] Filed: Sep. 25, 1987

[51] Int. Cl.$^4$ .............................................. A47F 5/13
[52] U.S. Cl. .................................... 211/150; 211/133; 280/79.3
[58] Field of Search ...................... 211/150, 133, 59.2, 211/149; 280/47.35, 79.3

[56] References Cited

U.S. PATENT DOCUMENTS

| | | | |
|---|---|---|---|
| 3,111,915 | 11/1963 | Gray | 211/150 X |
| 3,827,376 | 8/1974 | Solomon | 211/149 X |
| 3,981,511 | 9/1976 | Foster | 280/79.3 |
| 4,067,265 | 1/1978 | Watson | 211/150 X |
| 4,627,542 | 12/1986 | Fredrickson | 211/150 |
| 4,706,823 | 7/1986 | Visser | 211/133 |

Primary Examiner—Robert W. Gibson, Jr.
Attorney, Agent, or Firm—Cushman, Darby & Cushman

[57] ABSTRACT

A tilt-shelf cart system includes spaced, parallel uprights mounted atop a wheeled base with merchandise receiving shelves pivotally mounted between the uprights for limited pivotal movement between forwardly and rearwardly inclined positions. The pivot axes of the shelves are positoned so that the shelves, when fully loaded with merchandise, normally pivot toward their rearwardly inclined positions. The shelves are secured in either of the forwardly or rearwardly inclined positions by a latch mechanism which includes laterally extending latch pins which engage selected edges of a latch plate. The pins are withdrawn by a drawbar mechanism which requires both operator hands to operate. The two-handled drawbar is pivotally connected to a connecting link which, in turn, is pivotally connected to a rotatably mounted plate to cause limited rotation of the plate in response to movement of the connecting link. The plate is connected to each of the latch pins by respective links so that rotation of the plate disengages the latch pins from the plate to allow repositioning of the shelves from one position to the other. The two-handed drawbar feature places both of the operator hands in hazard-free positions at the time the shelves are moved from one position to the other to preclude any mishaps.

14 Claims, 8 Drawing Sheets

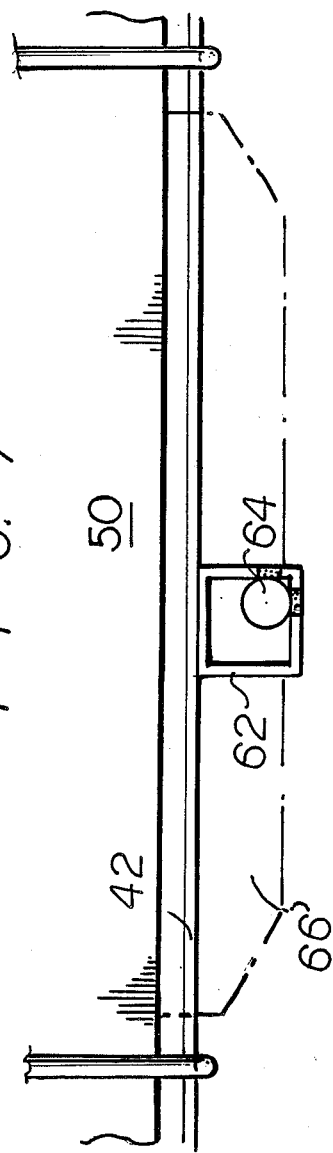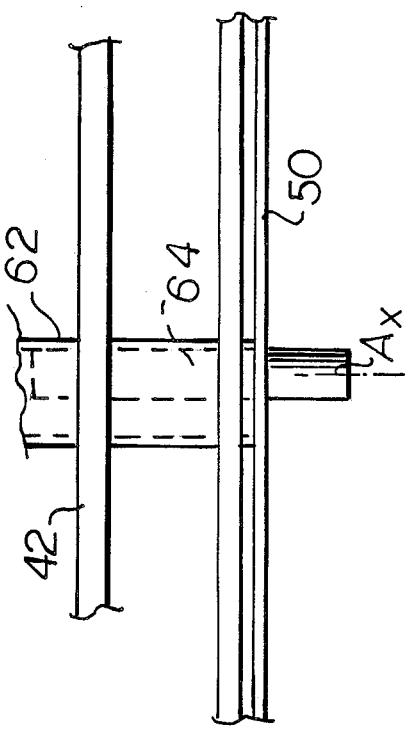

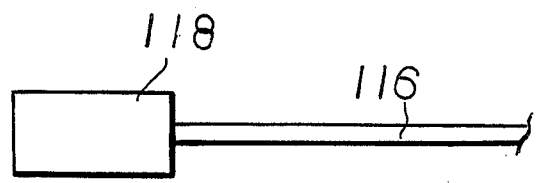
F I G. 8A
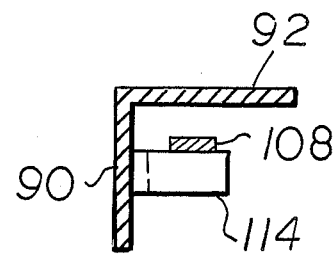
F I G. 9

TILT-SHELF DISPLAY CART

BACKGROUND OF THE INVENTION

The present invention relates to shelf systems used in the transport and display of merchandise and, more particularly, to tilt-shelf carts for supporting and displaying merchandise.

In the distribution of many products, particularly consumer products, it is common to display the goods on multi-tiered shelf systems in such a way that the consumer removes the goods from the shelf at the time of sale. In order to reduce the cost of shelf-stocking and to make the overall distribution system more time and cost efficient, standard-sized mobile shelf systems have been developed for shipping the goods from a distribution center to the sales point. For example, in the distribution of milk containers, wheeled multi-shelf carts having a standard configuration are loaded with milk containers at the dairy, and the fully loaded carts are transported to the store and positioned in a refrigerated display case where the milk containers are removed by consumers. In one type of cart, the shelves are forwardly inclined so that the containers on each shelf slide to a forward display position as the forwardmost container is removed by the consumer. The empty carts are then returned to a central dairy for re-loading by automatic machines and eventual return to the store. When the carts are machine loaded, it is preferred that the shelves be in a horizontal position to accept the milk containers from the loading machine. To this end, the shelves must be adjustable between a horizontal position to facilitate machine loading and a forwardly inclined position to provide a more favorable display profile.

The design of a tilt-shelf cart optimally suited for loading at a central loading facility, transport to the merchandiser, and for the display of the goods requires consideration of a number of different design criteria. For example, the tilt-shelf cart must be easily and conveniently operated by the attendant to move the shelves from the horizontal to the tilt position. Thus, any shelf system that uses manually operable latches on each shelf presents a system in which considerable labor must be used to move each shelf between its horizontal and forwardly tilted positions. Additionally, tilt-shelf cart systems in which independently operated latches are provided on each side of the shelf requires coordinated operation of the latches by the attendant. Also, the shelves must be configured so that they can be conveniently loaded using a conventional loading machine and yet provide a measure of protection for the goods during transport.

SUMMARY OF THE INVENTION

In view of the above, it is an object of the present invention, among others, to provide a tilt-shelf system in which the shelves can be conveniently and safely moved between first and second positions.

It is another object of the present invention to provide a tilt-shelf system in which the shelves, when fully loaded with merchandise, are normally biased towards a rearwardly inclined position.

It is still another object of the present invention to provide a tilt-shelf system in which the fully loaded shelves can be moved in synchronism between their respective positions.

It is still another object of the present invention to provide a tilt-shelf system in which the fully loaded shelves can be moved between their respective positions using a mechanism which requires two-handed operation to provide a safe operating environment for the attendant.

In view of these objects, and others, the present invention provides a tilt-shelf system in which a plurality of shelves are mounted for limited pivotal motion between first and second positions in which the shelves, when fully loaded, are biased towards the first position. A shelf position control mechanism includes latching pins on one of the shelves that are controlled by a pin withdrawal mechanism that is responsive to two-handed manipulation by the operator.

In the preferred embodiment, the tilt-shelf system includes spaced, parallel uprights mounted atop a wheeled base with merchandise receiving shelves pivotally mounted between the uprights for limited pivotal movement between forwardly and rearwardly inclined positions. The pivot axes of the shelves are positioned s that the shelves, when fully loaded with merchandise, normally pivot toward their rearwardly inclined positions. The shelves are secured in either of the forwardly or rearwardly inclined positions by a latch mechanism which includes laterally extending latch pins which engage selected edges of a latch plate. The pins are withdrawn by a drawbar mechanism which requires both operator hands to operate. The two-handled drawbar is pivotally connected to a connecting link which, in turn, is pivotally connected to a rotatably mounted plate to cause limited rotation of the plate in response to movement of the connecting link. The plate is connected to each of the latch pins by respective links so that rotation of the plate disengages the latch pins from the plate to allow repositioning of the shelves from one position to the other. The two-handed drawbar feature places both of the operator hands in hazard-free positions at the time the shelves are moved from one position to the other to preclude any mishaps.

The present invention advantageously provides a tilt-shelf display cart in which the shelves are conveniently movable from one position to the other in a convenient and safe manner.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 7 is a side view of the central portion of a shelf showing the pivot mounting for the pivot axis of the shelves;

FIG. 7A is a partial plan view of the pivot mounting of FIG. 7;

FIG. 8A is a view of the drawbar handle of FIG. 8 taken along line 8A—8A of FIG. 8; and FIG. 9 is a cross-sectional view taken along line 9—9 of FIG. 8.

DESCRIPTION OF THE PREFERRED EMBODIMENT

Figure 1:
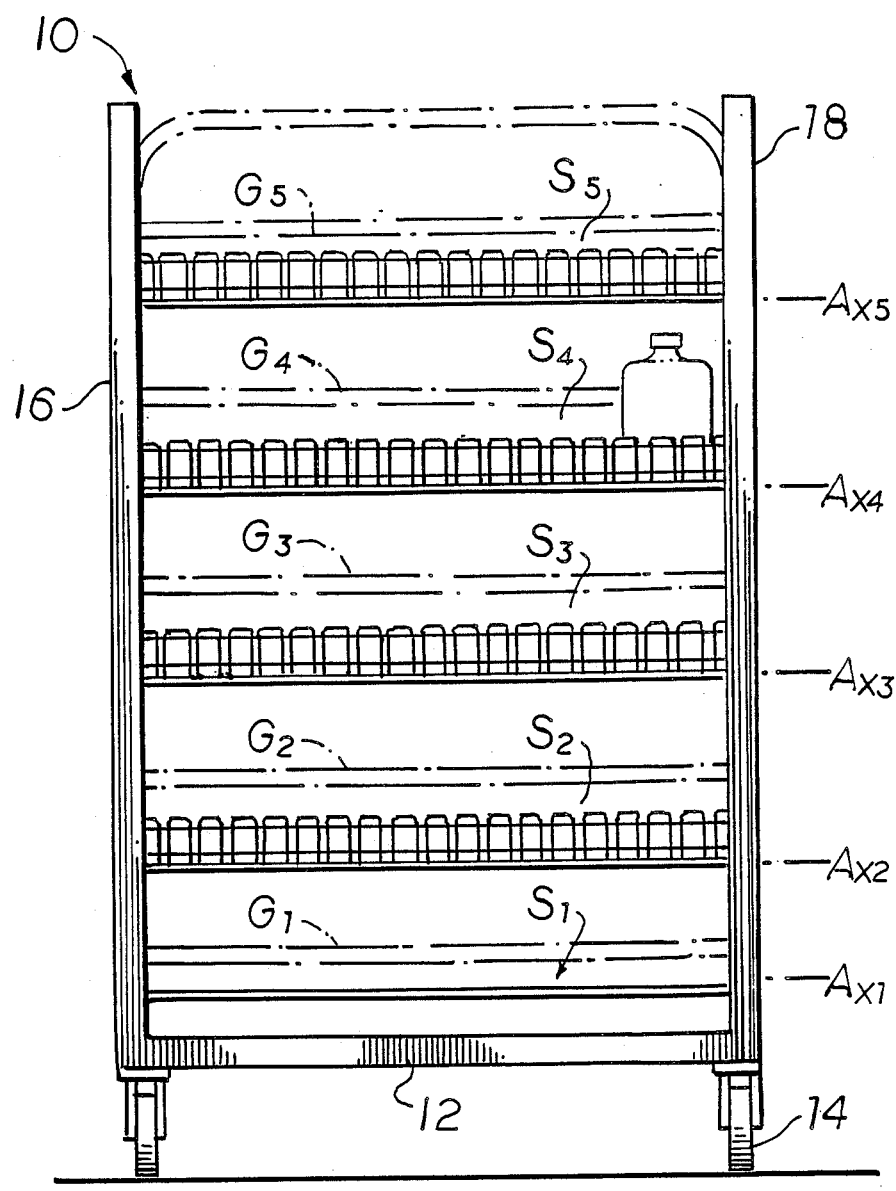
FIG 1 is a front elevational view of a tilt-shelf cart system in accordance with the present invention.
Figure 2:
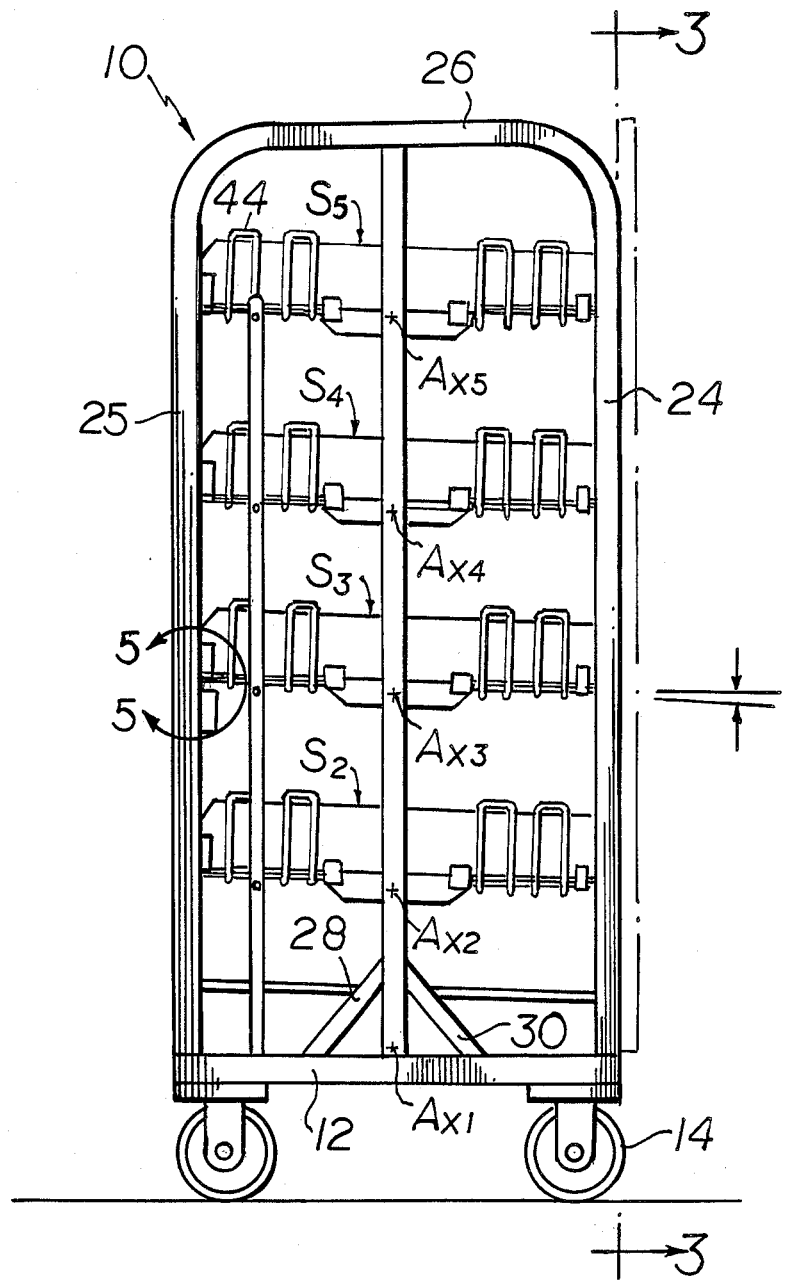
FIG. 2 is a side elevational view of the tilt-shelf cart system of FIG. 1.
Figure 3:
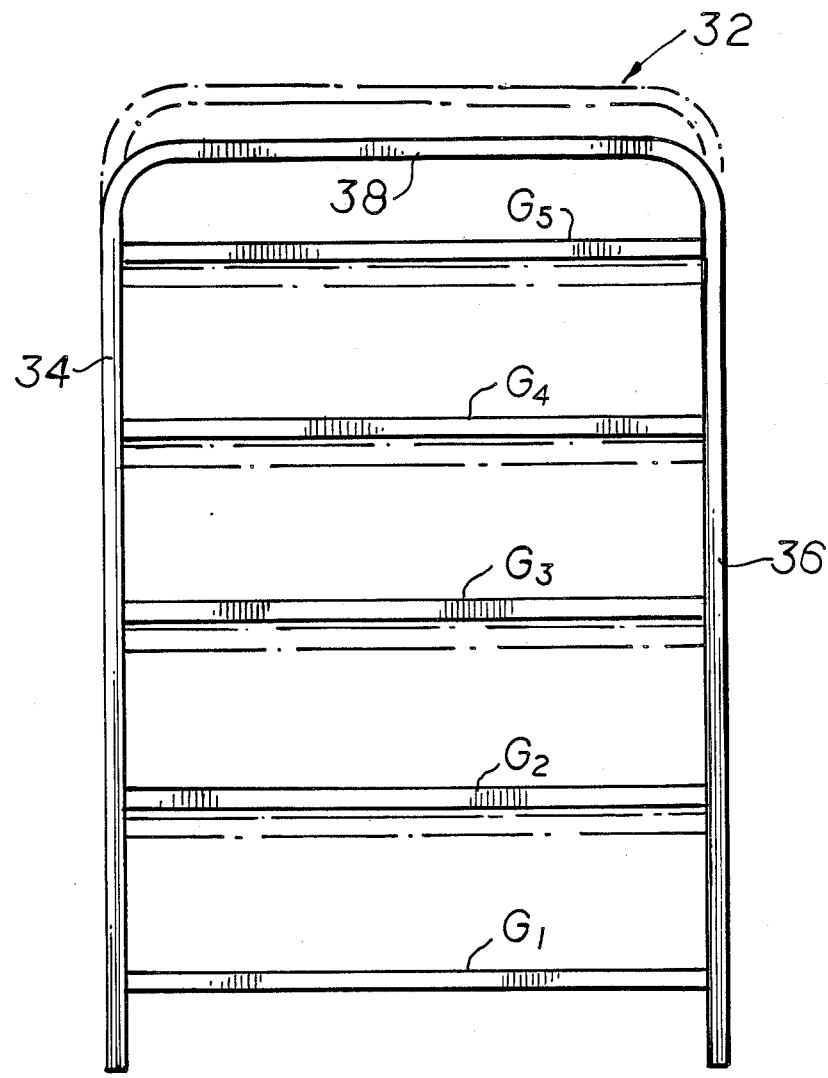
FIG. 3 is a front elevational view of a lift gate taken along line 3—3 of FIG. 2.

A tilt-shelf cart system in accordance with the present invention is shown in FIGS. 1 and 2 and designated generally therein by the reference character 10. As shown, the tilt-shelf cart system 10 includes a frame having a base 12 supported at its four corners by caster-type wheels 14 and spaced-apart, parallel side supports 16 and 18 extending vertically upward from the opposite ends of the base 12. As shown in FIG. 2, the side supports 16 and 18 are defined by forward, intermediate, and rear uprights 20, 22, and 24 that are joined at their upper ends by a top member 26. Oppositely inclined reinforcing members 28 and 30 are provided at the base of the intermediate upright 22 to provide additional structural rigidity to the frame. The frame may be fabricated, for example, as a weldment from stainless steel structural members having a "C"-shaped or rectangular cross-section. The tilt-shelf cart system 10 is provided with five shelves $S_1$, $S_2$, $S_3$, $S_4$, and $S_5$ for supporting goods, such as the containers C shown in FIG. 1. In the preferred embodiment, the containers C are either one or one-half gallon milk containers. The shelves $S_1$, $S_2$, $S_3$, $S_4$, and $S_5$ are loaded with containers C from the rear via a lift gate, designated generally by the reference character 32 and shown in frontal elevation in FIG. 3. The lift gate 32 includes spaced, parallel side rails 34 and 36 joined at their upper end by a top rail 38 and by horizontally aligned and spaced apart gate bars $G_1$, $G_2$, $G_3$, $G_4$, and $G_5$. The lift gate 32 may be fabricated in a manner analogous to that of the frame, this is, as a weldment from stainless steel structural members having a "C"-shaped or rectangular cross-section. As represented in full line and dotted line illustration in FIG. 3, the lift gate 32 is movable between a lowered position (as shown in solid-line illustration in FIG. 3 and dotted line illustration in FIG. 1) and a raised position (as shown in dotted line illustration in FIG. 3). In the lowered position, the various gate bars $G_1$, $G_2$, $G_3$, $G_4$, and $G_5$ function to prevent the containers C from sliding or otherwise falling off the respective shelves $S_1$, $S_2$, $S_3$, $S_4$, and $S_5$, and, in the upper position, provide sufficient height to allow containers C to be slid beneath the raised gate bars and onto the shelves $S_1$, $S_2$, $S_3$, $S_4$, and $S_5$. The lift gate 32 is moved between its lowered and upper position by an automatic cart loading machine as part of a machine loading cycle. The lift gate 32 is slidably mounted to the rear uprights 24 of the side supports 16 and 18 by hollow sleeves (not shown) secured to the rear uprights 24 and into which portions of the side rails 34 and 36 are received for limited up and down sliding motion.

Figure 4:
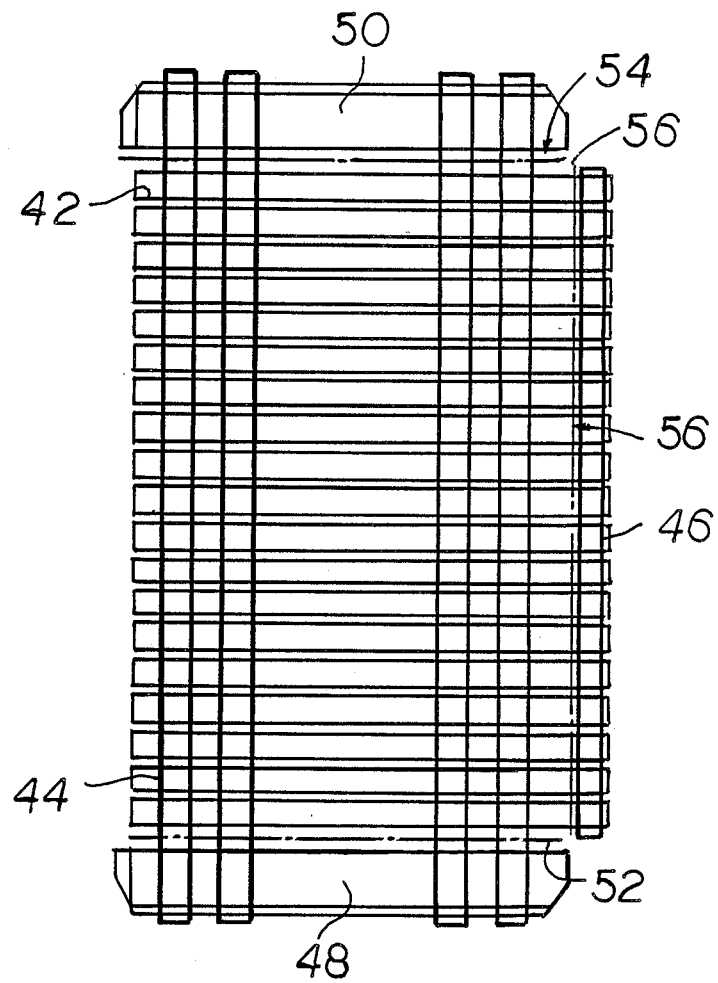
FIG. 4 is a plan view, in flat development, of a representative shelf of the tilt-shelf cart system.

As shown in FIGS. 1 and 2, the shelves $S_1$, $S_2$, $S_3$, $S_4$, and $S_5$ are mounted for limited pivotal motion about respective axes $Ax_1$, $Ax_2$, $Ax_3$, $Ax_4$, and $Ax_5$ with the connection between the individual shelves $S_1$, $S_2$, $S_3$, $S_4$, and $S_5$ and the intermediate upright 22 described more fully below in relationship to FIGS. 7 and 7A. The top four shelves $S_2$, $S_3$, $S_4$, and $S_5$ are fabricated from a welded-wire preform 40 while the lowermost shelf $S_1$ is fabricated from formed sheet metal. As shown in the flat development view of FIG. 4, the welded-wire preform 40 is formed from a plurality of rectangular loops 42 aligned in the front-to-back direction with four laterally aligned loops 44 and another laterally aligned loop 46 overlying the loops 42 to define a wire matrix that is secured together at one or more intersections by spot or resistance welding. Side panels 48 and 50 are secured, as by welding, to the opposite ends of the loop 44. The welded-wire preform 40 is bent along bend axes 52, 54, and 56 to provide the shelf-like configuration described above, and reinforcing corner braces 58 (shown in the side view of FIG. 5) are provided at the intersection of the side panels 48 and 50 and the loop 46 at the forward corners of the shelf to provide a measure of structural rigidity to the shelf.

The shelves $S_1$, $S_2$, $S_3$, $S_4$, and $S_5$ can be pivotally mounted to the intermediate support in a variety of ways including the pivot mounting 60 shown in FIGS. 7 and 7A. As shown, the pivot mounting 60 includes a support tube 62 having a square or rectangular cross-section that extends partly or entirely across the lateral direction of the shelf $S_n$. A cylindrical pivot bar 64 is inserted into the support tube 62 and welded in place, for example, by arc welding through bores in the wall section of the support tube 62 to the surface of the pivot bar 64. Lastly, a reinforcing plate 66 (shown in dotted line illustration in FIG. 7) may be provided at the end of the support tube 62. The remote ends of the pivot bar 64 are carried in appropriate bores formed in the intermediate upright 22 or in detachable bearing plates (not specifically shown) secured to the intermediate uprights 22.

The lowermost shelf $S_1$ is formed from flat sheet metal that is bent along appropriate bend axes, for example, in a sheet metal brake, to form a shelf have the same general configuration as the upper shelves $S_2$, $S_3$, $S_4$, and $S_5$. The upper shelves $S_2$, $S_3$, $S_4$, and $S_5$ are preferably formed from the welded-wire preform 40 so that containers C can be easily seen by the consumer and any liquid associated with the containers C can drain to the lowermost sheet metal shelf $S_1$ which serves to also prevent the consumer from viewing the floor upon which the tilt-shelf cart system 10 is supported.

Figure 5:
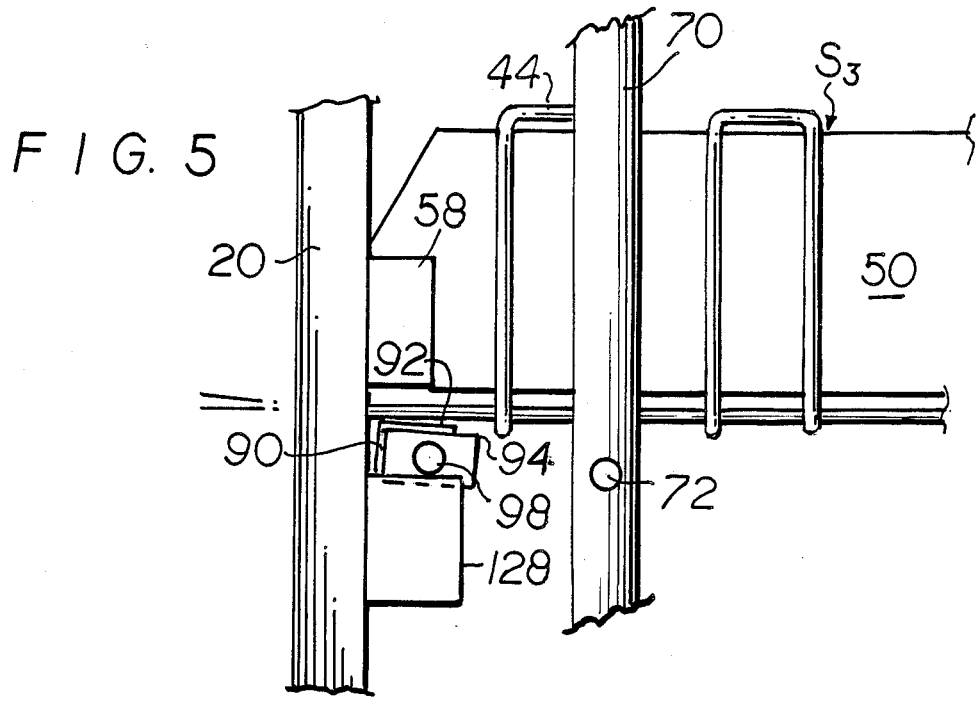
FIG. 5 is an enlarged detail view, taken along line 5—5 of FIG. 2, of a latch plate and cooperating pin for securing the shelves in one position or the other.
Figure 6:
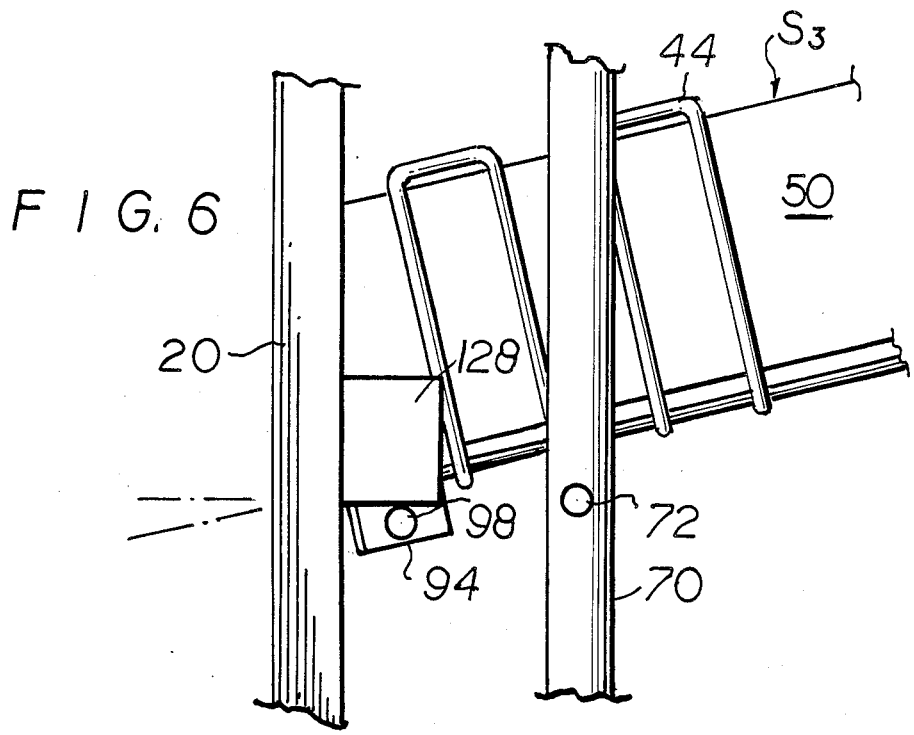
FIG. 6 is a view, similar to that of FIG. 5, showing the shelf in a forwardly inclined position.

As shown in FIG. 2, the shelves $S_1$, $S_2$, $S_3$, $S_4$, and $S_5$ are connected by a vertically aligned strap 70 with each shelf connected to the strap by a pivotal connection 72 which can include a bracket (not specifically shown) connected to the under side of each shelf. The strap 70 serves to connect the shelves so that they move in unison between their respective positions. As shown in FIGS. 5 and 6, the shelves $S_1$, $S_2$, $S_3$, $S_4$, and $S_5$ are movable between a first position, shown in FIG. 5, and a second position, shown in FIG. 6. In the first position, the shelves $S_1$, $S_2$, $S_3$, $S_4$, and $S_5$ are preferably in a near horizontal position with a rearward inclination of two to eight degrees. This rearward inclination serves to assist in draining any moisture which may accumulate in the lowermost shelf $S_1$. In the second position, the shelves $S_1$, $S_2$, $S_3$, $S_4$, and $S_5$ are inclined forwardly by a selected angle, such as 10 to 20 degrees, with an angle of 12–14 degrees being preferred and being sufficient to cause the containers C to slide to a forward position as each container C is removed from the shelf.

Figure 8:
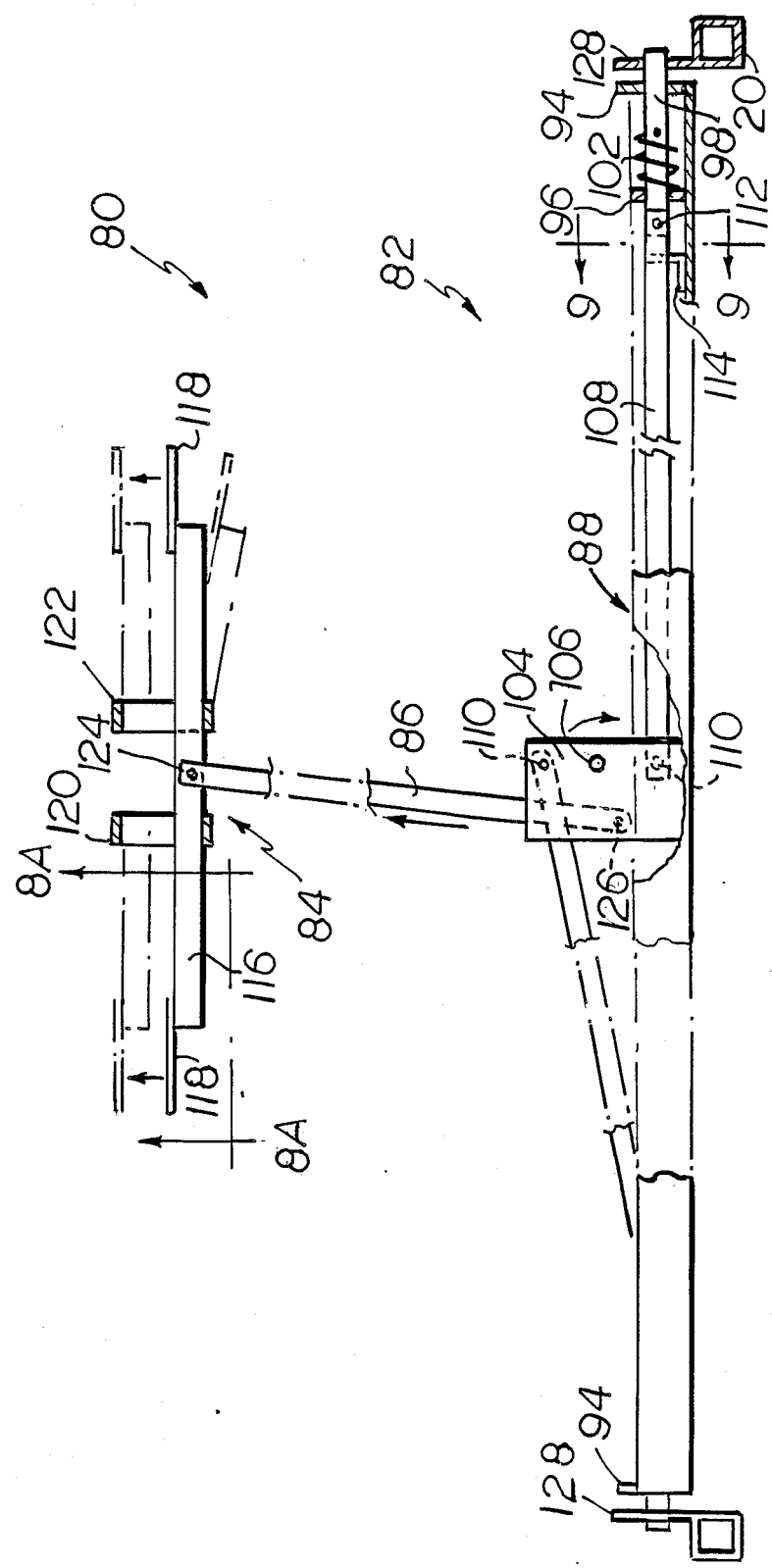
FIG. 8 is a top view of a latch control mechanism for securing the shelves to one position or the other.

The shelves $S_1$, $S_2$, $S_3$, $S_4$, and $S_5$ are maintained in either their first or second positions by a latch mechanism 80, shown in plan view in FIG. 8 and in side view in FIGS. 5 and 6. The latch mechanism 80 includes a latch pin assembly 82 and a handle unit 84 connected together through a connecting bar 86. The latch mechanism 80 is mounted beneath the third shelf S3 by spot or resistance welding selected components to the bottom of the shelf structure and using support brackets, as explained below. The latch pin assembly 82 includes, as shown in FIG. 8 and the cross-sectional view of FIG. 9, a structural cross-member 88 secured beneath the shelf adjacent the forward end, as shown in FIGS. 5 and 6. As shown in the cross-sectional view of FIG. 9, the cross-member 88 includes a side member 90 and a top member 92 aligned at right angles to provide structural rigidity. An end plate 94 is provided at each end of the cross-member 88 and a pin support plate 96 is secured to the cross-member 88 a selected distance from each end plate 94. The end plates 94 and the pin support plates 96 are each provided with coaxial bores (unnumbered) which receive a latch pin 98. The latch pins 98 extend laterally outward of the end plate 94 and include a circumferential groove (unnumbered) into which a "C"-clip 100 or equivalent structure is inserted. A helical spring 102, in compression, is mounted on each latch pin 98 between the pin support plate 96 and the clip 100 to resiliently urge its pin 98 in the laterally outward direction.

A pivot plate 104 is rotatably mounted about pivot connection 106 and is connected to the latch pins 98 by connecting links 108. As represented by the connecting link 108 on the right in FIG. 8, one end of the connecting link 108 is pivotally connected to the pivot plate 104 at pivot 110 and the other end is connected to the latch pin 98 at pivot 112. As shown in the cross-sectional view of FIG. 9, a bracket 114 is secured to the side member 90 to provide the connecting link 108 with an additional measure of support. The connecting link 108 on the left side of FIG. 8 is connected in a manner similar to that of the connecting link 108 on the right but is aligned at an angle as shown in FIG. 8.

The handle unit 84 includes a handle bar 116 having grasping plates 118 at its opposite ends and is carried beneath the shelf S3 by brackets 120 and 122 to allow limited movement between the solid-line and dotted-line positions of FIG. 8. The connecting bar 86 is pivotally connected to the handle bar 116 at a point intermediate its ends through a pivot connection 124 and to the pivot plate 104 at its other end through a pivot connection 126. The various pivot connections can be formed, for example, by rivet connections that connect the part together with sufficient clearance to allow the required pivoting freedom.

Latch plate 128, as shown in the top view of FIG. 8 and the side views of FIGS. 5 and 6, are secured to the front uprights 20 and have a vertical length sufficient to determine the angular rotation of the shelves $S_1$, $S_2$, $S_3$, $S_4$, and $S_5$ between their first and second positions and are positioned at an elevation on their supporting uprights 20 so as to determine the first and section positions of the shelves $S_1$, $S_2$, $S_3$, $S_4$, and $S_5$.

In order to move the shelves $S_1$, $S_2$, $S_3$, $S_4$, and $S_5$ between their respective first and second positions, the operator reaches beneath the third shelf S3 and use both hands to grasp the plates 118 at the opposite ends of the handle bar 116. The handle bar 116 is then pulled at its opposite ends from the solid line position in FIG. 8 to the dotted line position to cause the connecting link 86 to rotate the pivot plate 106 in the clockwise direction and cause the connecting links 108 to pull the latch pins 98 inward against the urging force of the springs 102. When the latch pins 98 are drawn sufficiently inward to clear the latch plates 128, the shelves $S_1$, $S_2$, $S_3$, $S_4$, and $S_5$ can be moved from one position to the other. When the shelves $S_1$, $S_2$, $S_3$, $S_4$, and $S_5$ are initially in their first position, as shown in FIG. 5, the rear ends of the shelves $S_1$, $S_2$, $S_3$, $S_4$, and $S_5$ are tilted upward by the operator to pivot them to their second position at which time the handle bar 116 is released to allow the springs 102 to extend the latch pins 98 laterally outward beneath the lower edge of the latch plates 128. Conversely, when the shelves $S_1$, $S_2$, $S_3$, $S_4$, and $S_5$ are initially in their second position, as shown in FIG. 6, the rear ends of the shelves $S_1$, $S_2$, $S_3$, $S_4$, and $S_5$ are normally biased, as described above, toward their first position and the shelves $S_1$, $S_2$, $S_3$, $S_4$, and $S_5$ are allowed to pivot clockwise to their first position and the handle bar 116 released to allow the springs 102 to extend the latch pins 98 laterally outward to engage the upper edge of the latch plates 128. While the preferred embodiment has been described as using latch plates 128 having upper and lower edges or surfaces engaged by the extended latch pins 98, other arrangements, include plates having two or more pin-receiving bores are also suitable.

Because the handle bar 116 requires two-handed operation, a measure of hazard-free operation is provided. Additionally, the latch mechanism 80 is designed so that single-handed operation will be insufficient to effect repositioning of the shelves. For example and as shown in FIG. 8, if the right grasping plate 118 only is gripped by the operator and pulled rearwardly, the handle bar 116 will pivot clockwise about the pivot connection 124 and rotate the other end of the handle bar 116 forwardly as shown in dotted line illustration in FIG. 8. As can be appreciated, this rotary motion of the handle bar 166 will not cause the latch pins 98 to retract to permit one-handed repositioning of the shelves $S_1$, $S_2$, $S_3$, $S_4$, and $S_5$.

Thus it will be appreciated from the above that as a result of the present invention, a tilt-shelf display cart is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A tilt-shelf display cart, comprising:
   a frame;
   at least two shelves mounted on said frame for rotation about respective axes between a first and at least one other position;
   means for releasably positioning said shelves at a selected one of said first and other positions and having means for engaging said frame to maintain said shelves at the selected position; and
   user operable means connected to said releasable positioning means and including a user operable handle having first and second handholds for operation by a user to cause said means for engaging said frame to effect disengagement therefrom in response to movement of said handle from one position to another.

2. The tilt-shelf display cart of claim 1, wherein said releasable positioning means comprises:
at least one latch pin extendable between retracted and advanced positions and engaging a cooperating member on said frame in the extended position to position the shelves at a selected one of said first and other position.

3. The tilt-shelf display cart of claim 2, wherein said releasable positioning means comprises:
first and second latch pins extendable between retracted and advanced positions and engaging respective cooperating members on said frame to position the shelves at a selected one of said first and other position.

4. The tilt-shelf display cart of claim 3, further comprising:
means for resiliently urging respective ones of said latch pins to their extended positions.

5. The tilt-shelf display cart of claim 3, wherein said handle comprises a handle bar having first and second handholds on opposite sides of an intermediate point.

6. The tilt-shelf display cart of claim 5, further comprising:
linkage means connected to said handle bar and connected to said latch pins to cause said latch pins to move from their extended positions to their retracted positions in response to movement of said handle bar from one position to another.

7. The tilt-shelf display cart of claim 6, wherein said linkage means is pivotally connected to said handle bar at the intermediate point.

8. The tilt-shelf display cart of claim 7, wherein said linkage means further comprises:
a member mounted for rotation about an axis;
a connecting member pivotally connected at one end to the intermediate point of said handle bar and to said rotatably mounted member at the other end; and
first and second connecting links pivotally connected between said rotatably mounted member and respective ones of said latch pins, wherein movement of said handle bar from one position to the other causes rotation of said rotatably mounted member and movement of said latch pins from their extended to their retracted positions.

9. The tilt-shelf display cart of claim 1, wherein said first and second shelf positions are non-horizontal.

10. The tilt-shelf display cart of claim 9, wherein said shelves are biased for rotation about their respective axes to a one of said first and other shelf positions.

11. The tilt-shelf display cart of claim 10, wherein the first position is inclined between two and eight degrees from the horizontal.

12. The tilt-shelf display cart of claim 11, wherein said shelves are biased for rotation about their respective axes to said first position.

13. The tilt-shelf display cart of claim 11, wherein the other position is inclined between ten and twenty degrees from the horizontal in an opposite direction from the first position.

14. The tilt-shelf display cart of claim 1, further comprising support wheels mounted to said frame.

* * * * *